No. 829,956. PATENTED SEPT. 4, 1906.
B. E. ELDRED.
PROCESS OF BURNING CEMENT.
APPLICATION FILED MAY 1, 1905.
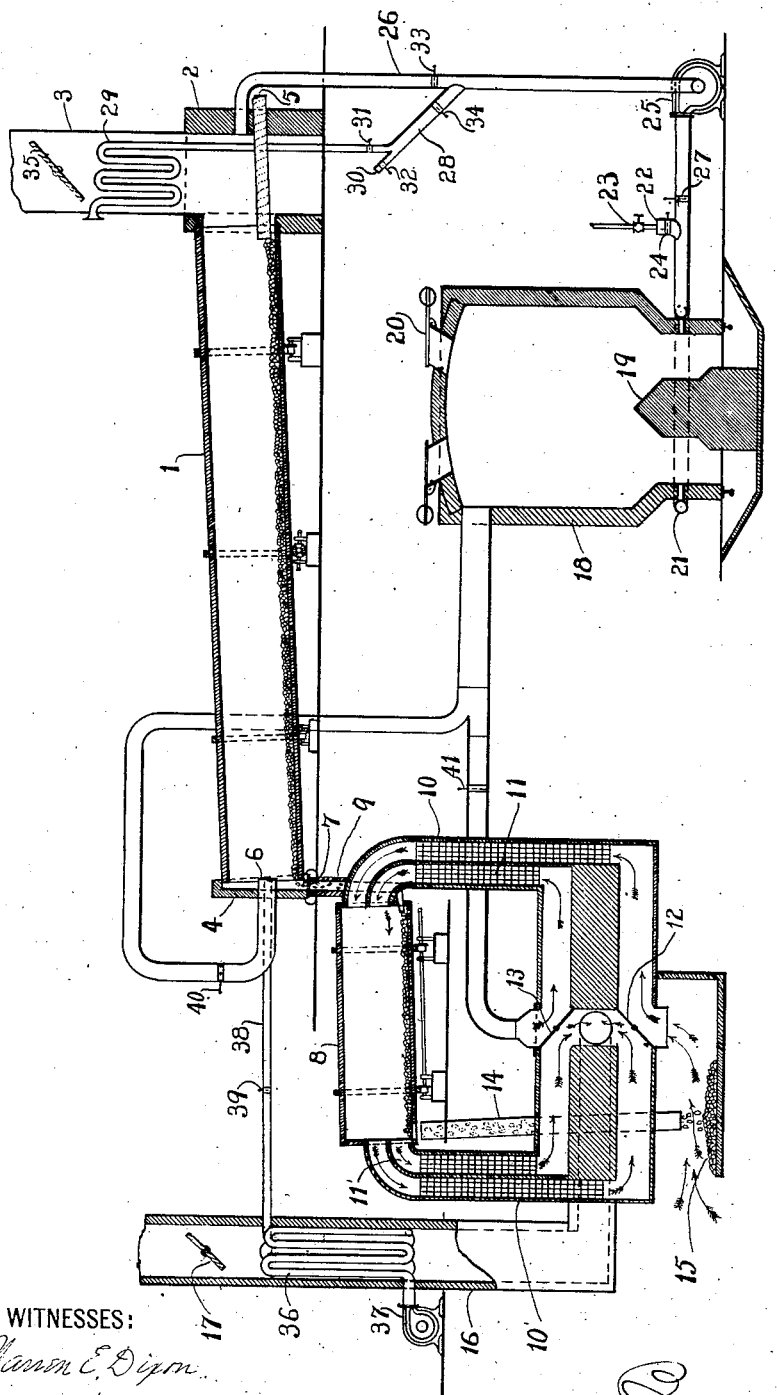
WITNESSES: INVENTOR

UNITED STATES PATENT OFFICE.

BYRON E. ELDRED, OF NEW YORK, N. Y.

PROCESS OF BURNING CEMENT.

No. 829,956.

Specification of Letters Patent.

Patented Sept. 4, 1906.

Application filed May 1, 1905. Serial No. 258,414.

*To all whom it may concern:*

Be it known that I, BYRON E. ELDRED, a citizen of the United States, and a resident of New York city, in the county of New York and State of New York, have invented certain new and useful Improvements in Processes of Burning Cement, of which the following is a specification.

This invention relates to the manufacture of cement clinker from the usual materials, such as clay and calcium carbonate, either naturally or artificially mixed; and it consists in a special method which involves performing the two predominant reactions of the cement process—namely, first, the calcining or driving off of carbon dioxid and water-vapor, and, secondly, the clinkering or final reactions attended with softening or semifusion in separate operations and with separate flames under such circumstances that the temperatures and heat conditions may be independently regulated in the two stages and both of the component operations, as well as the entire operation, more perfectly and economically enacted than before.

It has been the modern practice to burn cement with a long blast-flame in a rotary kiln, but to employ the same flame for both the calcining and the sintering or final vitrifying of the material, although the temperature requirements are very different in the two cases, the calcining step or expulsion of carbon dioxid and water being an endothermic process, requiring a comparatively low temperature (about 1,200° to 2,000° Fahrenheit) and a large volume of hot gases, while the clinkering reaction absorbs but little heat and is even exothermic, and should take place under high-temperature conditions, (about 2,500° Fahrenheit or higher). It is very difficult in practice with a single flame to obtain and maintain a proper balance between these two effects, so that in the one case the calcining shall be sufficiently performed before fusion sets in and in the other case the desired degree of fusion shall be effected before the material leaves the kiln or passes beyond the influence of the clinkering-flame. In practice the kiln-tender attempts to control matters by regulating the speed of the cylinder and the quantity of cement material fed in at the upper end per unit of time; but this requires the greatest skill, in spite of which the feed or travel of the material will, on the one hand, often be too slow in respect to the temperature of the flame, which means that too much heat is devoted to clinkering and too little to calcining, giving premature fusion of under-calcined material, while, on the other hand, if the speed is too fast the clinkering zone retreats toward the discharge end and too much of the heat goes into calcining and too little into clinkering, so that the cement may be under-fused. The flow of the material through the calcining zone can be regulated only by varying the flow through the clinkering zone. When variations in the composition of the cement material are encountered, a change in the feed or in the flame must often be effected, and this will frequently destroy the proper balance of operations in the kiln.

In my present invention I employ two or more separate and independent flames for the calcining and clinkering operations, respectively, and regulate each flame to a temperature corresponding to the operation in which it is engaged instead of, as formerly, trying to regulate one flame for both operations. I also preferably carry on the two steps of the burning process in chambers more or less separate, one of which may deliver the material into the other and maintain the heating influences in the two operations substantially independent. The conditions of combustion and rate of feed may then be independently regulated for each stage of the process, and the delicate balance of operations no longer exists.

I have discovered that one of the most important consequences of this stage method is that it now becomes possible to profitably employ a cheap and dustless fuel, such as a producer-gas, thus avoiding the expense and and danger of powdered coal, for by carrying on the two stages in separate chambers I am enabled to regenerate or recuperate the materials of combustion and obtain a very high temperature in the clinkering-chamber, while also employing a flame in the calcining-chamber especially suited to the calcining operation. Heretofore regeneration has not been found practicable, because the gases at the upper end of the kiln would be so full of dust as to clog the regenerators and so far cooled down in consequence of the absorption of their heat by the materials undergoing the endothermic calcining operation as to be of little use in obtaining a high clinkering temperature.

In the calcining stage I may use the gas and air with or without regeneration, while in the clinkering stage the gas or air, or both, are preferably regenerated, so as to obtain a very high temperature and great economy in fuel. I abstract the gases for heating the regenerators for the clinkering stage from the clinkering-chamber, where they are very hot and comparatively free from dust. Thus for clinkering the fuel heat is used in a very high-temperature form and only a small quantity of gases is required, while for calcining the volume of gases is preferably large and their temperature low. The calcining takes a longer time than the clinkering, and for that stage a producer-gas flame of moderate temperature and large volume is well adapted and is preferably carried well down in contact with the material. I may, however, raise the temperature of the calcining-flame and absorb more of its heat by passing more material in a given time. The gases at the end of this stage are hot enough to yield a moderate regenerating heat for the calcining-flame if it be desired to carry a hotter flame than one unregenerated. Since the chambers may each be made shorter than the usual length of a cement-kiln and the strong blast-current required to keep powdered fuel in suspension is no longer necessary, a weaker blast may be used and less dust produced in the calcining-chamber.

The operation in the calcining-chamber is advantageously carried to a point at which incipient fritting or softening of the material occurs, so that it enters the clinkering-chamber practically free from dust.

Among other advantages which may be named are the ability to force the feed, if necessary, especially in the clinkering-chamber, enabling a smaller clinkering-kiln to handle the material and enabling several calcining-kilns in parallel to feed a single clinkering-kiln. Conversely, several clinkering-chambers might take the product of a single calcining-chamber.

Since there is a relatively moderate temperature in one chamber and a relatively high temperature in the other, with no intermediate temperature, the formation of "rings" adhering to the lining of the kiln is avoided. The material is accessible between stages for withdrawing samples for the purpose of analysis. Wear and tear due to sudden changes in temperatures and to widely-different temperatures in different parts of the same chamber are avoided.

In the drawing, 1 is a rotary calcining-kiln similar to the ordinary rotary Portland-cement kiln and provided with the housing 2, the stack 3, the header 4, and feeding device 5.

At 6 is shown an inlet for the entrance of combustible and air.

7 is a discharge-outlet opening into the chute 9, which discharges the calcined material into the rotary heating-chamber 8. This chamber at each end is equipped with the reversing regenerators 10 10' and 11 11', the former being the air-regenerators and the latter the gas-regenerators.

12 and 13 are reversing valves similar to those used in the ordinary type of reversing regenerative furnace.

14 is a clinker-discharge chute discharging material into the cooler 15.

16 is a stack for the removal from the regenerative furnace of the products of combustion. In this stack is placed a damper 17.

18 is a gas-producer having the blast-baffle 19, the feed-inlet 20, and the twyers 21.

22 is a steam-blower provided with the steam-jet 23 and the damper 24.

25 is a fan interposed in the conduit 26. On the exhaust side of the fan is placed a damper 27.

28 is a flue connecting with a continuous regenerator or heat-recuperator 29, placed in the stack 3.

30 is a cold-air inlet.

The dampers 31 32 33 34 serve to regulate the flow of stack gas and air through these passages. The damper 35 is placed in the stack 3 to regulate the draft in the kiln 1.

36 is a heat-regenerating device placed in the stack 16 and through which is supplied, by means of the fan 37, an air-blast which enters the kiln at 6 through the passage 38.

39 and 40 are dampers placed in the air and gas inlet pipes.

In the operation of my process the raw material is introduced into the kiln at 1 and is there subjected to a calcining-flame by the combustion of the producer-gas with air admitted into the lower part of the kiln, as above indicated. A long voluminous flame is here produced, giving that "soaking" heat or slow heat undulation requisite for the dissociation from the material of the carbon dioxid chemically combined with the lime and magnesia. The material which passes through the chamber 1 is freed by the application of this specifically calcining-flame from its carbon dioxid and falls through the chute 9 into the clinkering-kiln 8. Here a high temperature is maintained by means of the regenerative system employed, the material being maintained at or rapidly brought to the temperature at which the clinker-forming exothermic reaction occurs. The material is finally discharged into the clinker-cooler 15, over which a current of air is caused to flow. As soon as the material is sufficiently cooled it may be ground to the fineness required.

Various apparatus may be employed to carry out the process. For example, instead of a rotary kiln for clinkering a furnace equipped with a shaking-hearth may be employed. Different kinds of fuel may be employed, suited to the particular character of furnace, although producer-gas is preferred, for the reasons already stated.

In operating the furnace the transition-point between the calcining and clinkering stages may to some extent shift from one chamber to the other, it being one of the advantages of the invention that great latitude of operation is possible and little skill required, where formerly the reverse was true.

Under some conditions it may be found desirable to perform the calcining and clinkering at different times—that is, non-continuously. My invention enables this to be effected. The main purpose of passing the calcines directly into the clinkering-kiln is of course to conserve the heat in the calcines.

I have not attempted to state all the advantages and permissible modifications of my invention, which will be recognized as capable of a wide variation in practice without losing its distinguishing characteristics.

It will be understood that I do not claim to have originated the separate performance of the calcining and clinkering operations in cement manufacture; but I believe myself to be the first to utilize the two-stage method with reference to the regulation and control of temperatures by internal heating in reverberative chambers with special fuels, and more particularly with regard to the advantages of using producer-gas and other weak gases in both or either of the stages and successfully regenerating the materials of combustion.

What I claim as new, and desire to secure by Letters Patent, is—

1. Process of burning cement which consists in passing a pulverulent stream of the cement-forming material continuously at a regulated and controllable rate through a plurality of internally and separately fired chambers maintained at progressively-higher temperatures.

2. The process of converting cement material into cement-clinker which consists in calcining an outspread layer of the raw material in a reverberative chamber by means of an internal superincumbent gas-flame, introducing the calcined material while still hot into a second reverberative chamber, and clinkering the material in the second chamber by means of another gas-flame.

3. Process of burning cement which consists in separately calcining and clinkering different parts of a traveling compact stream of material in successive reverberative chambers by means of independent superincumbent flames.

4. Process of burning cement which consists in treating a compact stream of the material reverberatively with internal superincumbent gas-flames propagated from different points along the course of said stream.

5. Process of burning cement which consists in feeding the material in a stream, subjecting the stream in one portion to a relatively cool flame, and subjecting the stream in a subsequent portion to a relatively hot independent flame propagated at a point longitudinally remote from the first flame.

6. Process of burning cement which consists in calcining the raw material and clinkering the calcined material successively in a continuous operation, abstracting the gaseous clinkering agent between the two stages, and employing it in the process for purposes of regeneration.

7. Process of burning cement which consists in introducing previously-calcined cement-forming material into a clinkering-chamber, burning weak gas in said chamber to make a clinkering flame and clinkering the material with said flame, abstracting the products of combustion while approximately at the temperature of the clinkering operation, and regenerating one or more of the combustion fluids by means of said products.

8. The method of making cement in stages which consists in calcining the raw material by a suitable heating agent, and clinkering the calcined material by means of a separate producer-gas flame regenerated with waste heat from the clinkering stage.

9. The method of making cement which consists in performing the calcining and clinkering operations by means of separate producer-gas flames of different temperatures.

10. The method of making cement which consists in performing the calcining and clinkering operations respectively in serial chambers with a relatively cool calcining-flame in the calcining-chamber and an independent relatively hot clinkering-flame of producer-gas in the clinkering-chamber regenerated by gases abstracted from the clinkering-chamber.

11. The process of burning cement which consists in passing pulverulent cement-forming material through a reverberative chamber, calcining it in said chamber by means of a long voluminous flame produced by burning therein a preëxisting weak gas such as producer-gas, and removing the material from said chamber when the calcination is substantially complete but before the major part of the clinkering has taken place.

12. The process of burning pulverulent cement material which consists in calcining the material in a reverberative chamber by means of a superincumbent flame and carrying the operation therein only so far as to produce an incipient fusion in the material in order to prepare it for removal from said chamber and subsequent treatment elsewhere.

13. The process of burning cement which consists in calcining and clinkering the pulverulent material in successive chambers by means of independent flames in the respective chambers and carrying the operation in the first chamber far enough to produce an incipient fritting of the material in order to reduce the emission of dust therefrom on entering the second chamber.

Signed at New York city, in the county of New York and State of New York, this 28th day of April, A. D. 1905.

BYRON E. ELDRED.

Witnesses:
JAS. K. CLARK,
A. M. SENIOR.